July 24, 1962 W. C. SCHMIDT 3,046,051
TRACTOR SEAT BACK-REST
Filed April 25, 1961
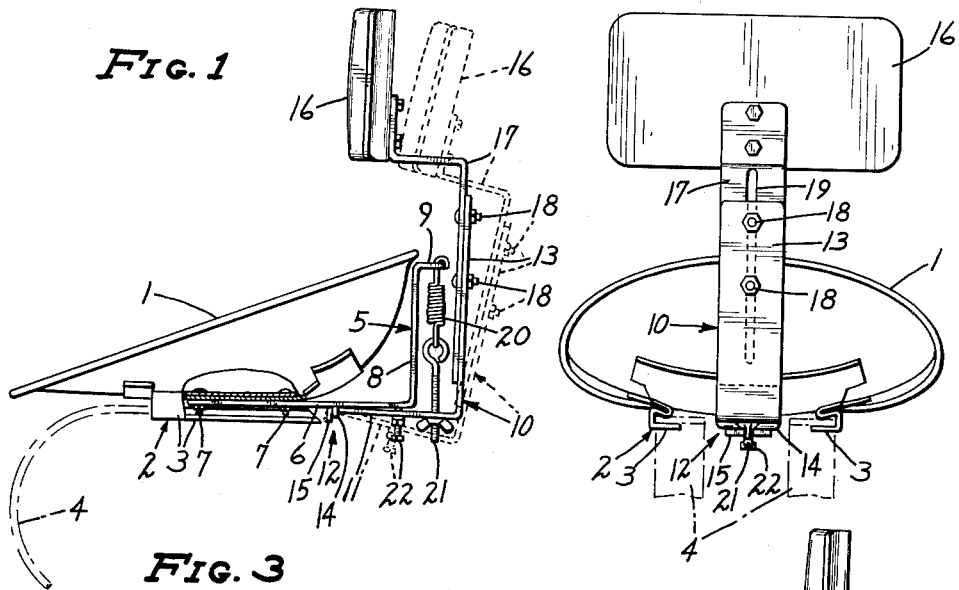
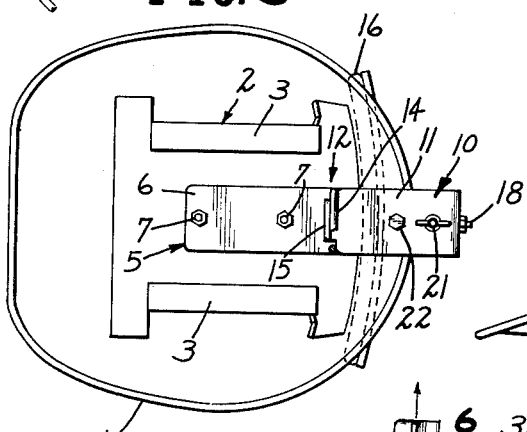
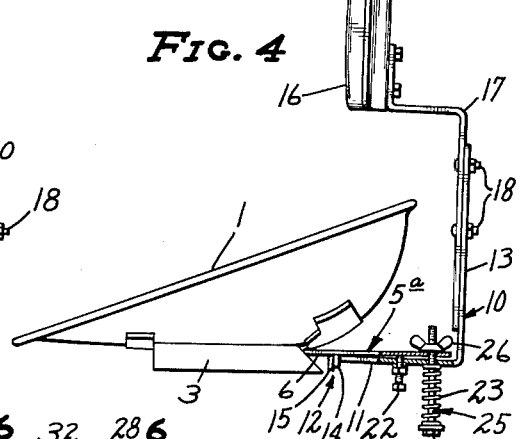
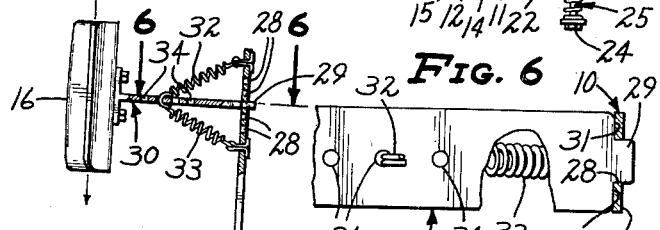
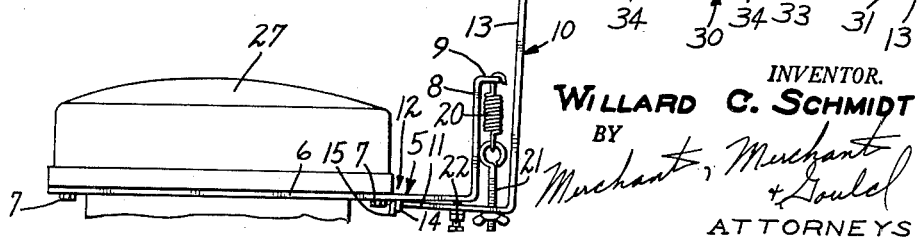
INVENTOR.
WILLARD C. SCHMIDT
BY
Merchant, Merchant
+ Gould
ATTORNEYS 3,046,051
TRACTOR SEAT BACK-REST
Willard C. Schmidt, Rte. 2, Willmar, Minn.
Filed Apr. 25, 1961, Ser. No. 105,478
3 Claims. (Cl. 297—306)

My invention relates generally to seats for tractors and the like, and more particularly to back-rests therefor.

The running of a tractor over rough terrain is an extremely tiring job. Particularly is this true due to the fact that the seats of tractors have not heretofore been provided with suitable back-rests or supports.

The majority of tractor seats are of the bucket type and are spring mounted with respect to the tractor. On the other hand, there are some makes of tractors which are provided with resilient cushion type seats which are rigidly secured to the tractor.

The primary object of my invention is the provision of a novel back-rest for tractor seats of both the bucket type and the pad type.

A further and highly important object of my invention is the provision of a back-rest which, when secured to bucket type tractor seats, maintain a constant spaced relation with respect thereto throughout the range of its raising and lowering movements.

A still further object of my invention is the provision of a device of the class above described in which means is provided for vertically adjusting the back-rest with respect to the seat.

A further object of my invention is the provision of a novel mounting means for said back-rest whereby the back-rest pad is yieldingly but adjustably biased toward a forward, back-engaging position, and against backward swinging movements.

Another object of my invention is the provision of a device of the class immediately above described wherein means is provided for varying the limit of forward movement of the pad with respect to the seat.

A further object of my invention is the provision of novel means whereby, when devices of the type immediately above described are secured to relatively immovable seats of the cushion type, the back-rest pad is mounted, by novel means, permitting limited upward and downward swinging movements, together with yielding means biasing said pad toward an intermediate position of said swinging movements, whereby to permit the back-rest pad to constantly engage the back of the driver in a desired position, irrespective of relative raising and lowering movements of the driver due to rough terrain over which the tractor is passing.

Still further and highly important objects of my invention is the provision of a device of the class above described which is relatively inexpensive to produce, which has a minimum of working parts and which is consequently relatively trouble free and durable.

A still further object of my invention is the provision of a device of the class above described which is extremely easy to attach and remove from a seat of a tractor.

The foregoing and other objects and advantages of this invention will become apparent from the following detailed specification, appended claims and attached drawings.

Referring to the drawings wherein like reference characters indicate like parts or elements throughout the several views:

FIG. 1 is a view in side elevation of a conventional bucket type tractor seat showing my novel back-rest attached thereto, some parts being broken away and some parts shown in section;

FIG. 2 is a view in rear elevation of the structure in FIG. 1;

FIG. 3 is a view in bottom plan of the structure of FIGS. 1 and 2;

FIG. 4 is a view corresponding to FIG. 1 but illustrating a slightly modified form of my invention;

FIG. 5 is a view in side elevation showing my novel structure attached to a tractor seat of the cushion type and showing a still further modified form of my invention; and FIG. 6 is an enlarged fragmentary view partially in top plan and partially in horizontal section taken on the line 6—6 of FIG. 5, some parts being broken away.

Referring particularly to the drawings, and initially to the structures of FIGS. 1–3 inclusive thereof, the numeral 1 indicates a conventional tractor seat of the bucket type. As shown, and also in a conventional manner, the seat 1 is provided with a mounting plate 2, opposite side edge portions of which are back turned upon themselves to form opposed anchoring channels 3 for the snug reception of C-shaped flexible resilient mounting bars 4. The lower ends of the mounting bars are secured to a tractor, not shown.

In accordance with my invention, a generally L-shaped mounting arm, identified in its entirety by the numeral 5, has its horizontal arm portion 6 rigidly secured to the under side of the seat 1 by any suitable means such as nut-equipped bolts 7, whereby it extends rearwardly therefrom. The vertically extended portion 8 of the arm 5 extends upwardly immediately rearwardly of the seat and provides at its upper end a horizontal anchoring ear 9.

A generally L-shaped mounting bracket, identified in its entirety by the numeral 10, has its horizontally disposed leg portion 11 underlying the horizontal portion 6 of the arm 5, and pivotally secured thereto as indicated at 12. The mounting bracket 10 likewise includes a vertically disposed mounting arm portion 13 which is rearwardly disposed, but normally generally parallel to the vertical portion 8 of the mounting arm 5. Preferably, the pivot means 12 includes a stirrup 14 of the under side of the horizontal portion 6 of the mounting bar 5 and a reduced hook-defining foot portion 15 on the extreme forward end of the horizontal portion 11 of the mounting bracket 10, and receivable within said stirrup 14.

A back-engaging pad 16, shown as being rigidly secured to the upper end of an angular bar 17, is vertically adjustable with respect to the seat 1 through the medium of nut-equipped bolts 18 passing through a vertical extended slot 19 in the bar 17 and through apertures, not numbered, in the vertical leg portion 13 of the mounting bracket 10.

By virtue of the arrangement immediately above described, it should be obvious that the mounting bracket 10 and parts carried thereby are mounted for forward and rearward swinging movements from the full line position in FIG. 1 wherein the pad overlies the rear end portion of the seat 1, to a position generally downwardly and rearwardly therefrom as indicated by dotted lines in FIG. 1.

A coil tension spring 20 has its opposite ends operatively connected to the anchoring ear 9 associated with the mounting arm 5 and the rearwardly projected end of the horizontal leg 11 of the mounting bracket 10, whereby to yieldingly bias the mounting bracket 10 and the pad 16 carried thereby toward the limit of its forward movement, as indicated by full lines in FIG. 1. For the purpose of varying the degree of bias exerted by the spring 20 on the mounting bracket 10, a thumb nut-equipped eye-bolt 21 is interposed between the lower end of the spring 20 and the mounting bracket 10.

To vary the extent of forward swinging movement of the pad with respect to the driver seated upon the seat 1, I preferably, and as shown, provide an adjustable abutment 22. The adjustable abutment 22 is in the nature of a lock nut-equipped bolt projecting upwardly through and having threaded engagement with the horizontal leg portion 11 of the bracket 10 and abutting against the under surface of the horizontal portion 6 of the mounting arm 5.

With respect to the slightly modified form of my invention shown in FIG. 4, all portions with the exception of the mounting bar and the yielding connection between the mounting arm and bracket are identical with corresponding portions of the structures illustrated in FIGS. 1-3 inclusive, and bear like reference characters. With respect to the mounting arm of FIG. 4, the same is identified by the numeral 5a. As there shown, a coil compression spring 23 is interposed between the head 24 of a mounting bolt or the like 25, and the under surface of the horizontal leg 11. A wing nut 26 is screw threaded on the upper end of the bolt 25 and engages the upper surface of the mounting arm 5a, and is utilized to vary the compressive force of the spring 23.

In the modified structures of FIGS. 5 and 6, wherein a novel back-rest attachment is shown in use in combination with a cushion type seat 27, the upper end portion of the vertical leg 13 is provided with a plurality of vertically spaced slot-like apertures 28 which are adapted to selectively receive the reduced inner end 29 of a mounting bar 30 that is rigidly secured to and extends rearwardly from the back-rest 16. As shown particularly in FIG. 6, the mounting bar 30, adjacent the reduced end 29 thereof is formed to provide a pair of shoulders 31 which engage the front surface of the leg 13 on opposite sides of the slots 28. The fit of the reduced portion 29 within the slots 28 is such as to permit limited vertical swinging movements of the bar 30 and pad 16 carried thereby.

Yieldingly biasing the mounting bar 30 and pad 16 toward an intermediate position of their common swinging movements, are upper and lower coil tension springs 32, 33 respectively, the rear end portions of which are suitably secured to the leg 13 in vertically spaced relationship to the reduced rear end 29 of the mounting arm 30, the front ends of the springs 32, 33 being anchored in a selected one of a plurality of longitudinally spaced openings 34 in the mounting arm 30.

The other parts of the bracket and mounting arm of FIGS. 5 and 6 are identical to corresponding parts shown in FIGS. 1-3, and are identified by corresponding reference characters.

This invention has been thoroughly tested and found to be completely satisfactory for the accomplishment of the above objects; and while I have shown and described a preferred embodiment in which the principles of the present invention have been incorporated, I wish it to be specifically understood that the same may be modified without departure from the scope and spirit of the appended claims.

What I claim is:

1. In a back-rest for tractor seats and the like, a generally L-shaped mounting bracket, a generally L-shaped mounting arm for said bracket and comprising a generally horizontal arm portion secured to the under side of a tractor seat and a generally vertically extended portion disposed rearwardly of said seat, said bracket including a generally horizontally disposed leg underlying the horizontal portion of said arm and a vertical leg disposed rearwardly of said vertically disposed mounting arm portion, means pivotally mounting said horizontally extended bracket leg to the horizontal portion of said mounting arm on a horizontal axis for generally forward and rearward swinging movements of the vertical leg of said bracket, a back-engaging pad, means mounting said pad on said vertical leg for common movements therewith, a coil spring, means operatively connecting the opposite ends of said spring to the upper end of said vertically disposed arm portion and to said bracket and including an adjustable element for varying the yielding bias of said spring, said spring yieldingly urging said bracket in a forward direction of movement of said vertical leg, and stop means for varying the forward limit of movement of said vertical leg, whereby to vary the position of said pad forwardly and rearwardly relative to said seat.

2. The structure defined in claim 1 in which said means pivotally mounting said horizontally extended bracket leg to said mounting arm comprises a stirrup on said mounting arm, said horizontally extended bracket leg having a reduced foot portion defining a hook pivotally received in said stirrup.

3. In a back-rest for tractor seats and the like, a generally L-shaped mounting bracket including a generally horizontally disposed leg and a vertical leg, a horizontally disposed mounting arm secured to the underside of a tractor seat and projecting rearwardly therefrom, said mounting arm intermediate its ends defining a depending stirrup of less lateral dimension than the maximum transverse dimension of the horizontally disposed leg of said mounting bracket, the forward end of said horizontally disposed leg being formed to define a transversely reduced hook-acting foot which is receivable in said stirrup and which mounts said mounting bracket for swinging movements about a horizontal axis with the horizontal leg thereof underlying said mounting arm and with the vertical leg thereof rearwardly disposed with respect to said seat and arm, a back-engaging pad, means mounting said pad on the upper end of said vertical leg for common movements therewith, yielding means connecting the rear end of said arm to the horizontal leg of said mounting bracket in closely spaced relation to the vertical leg thereof, means for varying the yielding bias exerted by said yielding means, and stop means for varying the forward movement of said vertical leg whereby to vary the position of said pad towards and away from said seat.

References Cited in the file of this patent

UNITED STATES PATENTS

| | | |
|---|---|---|
| 1,358,273 | Wolford | Nov. 9, 1920 |
| 2,662,586 | Cramer | Dec. 15, 1953 |